US 7,228,555 B2

(12) United States Patent
Schlack

(10) Patent No.: US 7,228,555 B2
(45) Date of Patent: Jun. 5, 2007

(54) SYSTEM AND METHOD FOR DELIVERING TARGETED ADVERTISEMENTS USING MULTIPLE PRESENTATION STREAMS

(75) Inventor: John A. Schlack, Southampton, PA (US)

(73) Assignee: Prime Research Alliance E., Inc., Tortola (VG)

( * ) Notice: Subject to any disclaimer, the term of this patent is extended or adjusted under 35 U.S.C. 154(b) by 1159 days.

(21) Appl. No.: 09/750,800

(22) Filed: Dec. 28, 2000

(65) Prior Publication Data

US 2002/0087975 A1 Jul. 4, 2002

Related U.S. Application Data

(60) Provisional application No. 60/229,156, filed on Aug. 31, 2000.

(51) Int. Cl.
*H04N 7/025* (2006.01)
*H04N 7/10* (2006.01)

(52) U.S. Cl. .......................................... 725/35; 725/36
(58) Field of Classification Search .................. 725/32, 725/34–36, 114–120, 138, 144–148
See application file for complete search history.

(56) References Cited

U.S. PATENT DOCUMENTS

| 4,930,011 | A | 5/1990 | Kiewit |
| 5,029,014 | A | 7/1991 | Lindstrom |
| 5,099,319 | A | 3/1992 | Esch |
| 5,155,591 | A | 10/1992 | Wachob ........................ 358/86 |
| 5,231,494 | A | 7/1993 | Wachob ........................ 358/146 |
| 5,271,626 | A | 12/1993 | Llenas et al. |
| 5,319,455 | A | 6/1994 | Hoarty |
| 5,410,344 | A | 4/1995 | Graves et al. |
| 5,424,770 | A | 6/1995 | Schmelzer |
| 5,425,100 | A | 6/1995 | Thomas et al. ................ 380/20 |
| 5,446,919 | A | 8/1995 | Wilkins |

(Continued)

FOREIGN PATENT DOCUMENTS

CA 2264392 1/1999

(Continued)

OTHER PUBLICATIONS

Bar-el, Method and system for personalizing images inserted into a video stream, International Publication Date: May 27, 1999, International Publication No. WO 99/26415.*

(Continued)

*Primary Examiner*—John Miller
*Assistant Examiner*—John Manning

(57) ABSTRACT

A system and method for delivering channels of presentation streams carrying targeted advertisements in a television service network environment. The system includes a generator for generating a set of presentation streams for each of programming channels, each of the presentation streams in each set having same programming data but different ads directed to advertiser-specific market segments of different advertisers. A plurality of local routing stations receive the generated sets of presentation streams. At least one local routing station processes the sets of presentation streams and selectively switches between the presentation streams in each set to output one presentation stream for a programming channel. As a result, a presentation stream carrying the most appropriate ad is provided to a viewer at any given time for at least one programming channel.

10 Claims, 5 Drawing Sheets

U.S. PATENT DOCUMENTS

| | | | |
|---|---|---|---|
| 5,457,562 A | 10/1995 | Tremblay | 359/188 |
| 5,534,911 A | 7/1996 | Levitan | |
| 5,559,549 A | 9/1996 | Hendricks et al. | 348/6 |
| 5,579,055 A | 11/1996 | Hamilton et al. | |
| 5,585,858 A | 12/1996 | Harper et al. | 348/485 |
| 5,600,364 A | 2/1997 | Hendricks et al. | 348/1 |
| 5,600,366 A | 2/1997 | Schulman | |
| 5,612,742 A | 3/1997 | Krause et al. | |
| 5,621,728 A | 4/1997 | Lightfoot | |
| 5,636,346 A | 6/1997 | Saxe | |
| 5,650,994 A | 7/1997 | Daley | |
| 5,652,615 A | 7/1997 | Bryant et al. | |
| 5,661,516 A | 8/1997 | Carles | |
| 5,724,091 A | 3/1998 | Freeman | |
| 5,724,521 A | 3/1998 | Dedrick | |
| 5,740,549 A | 4/1998 | Reilly et al. | |
| 5,752,160 A | 5/1998 | Dunn | |
| 5,752,238 A | 5/1998 | Dedrick | |
| 5,758,328 A | 5/1998 | Giovannoli | |
| 5,761,601 A | 6/1998 | Nemirofsky | |
| 5,774,170 A | 6/1998 | Hite | |
| 5,781,226 A | 7/1998 | Sheehan | |
| 5,790,426 A | 8/1998 | Robinson | |
| 5,790,935 A | 8/1998 | Payton | |
| 5,801,747 A | 9/1998 | Bedard | |
| 5,801,753 A | 9/1998 | Eyer et al. | |
| 5,808,694 A | 9/1998 | Usui et al. | |
| 5,815,671 A | 9/1998 | Morrison | |
| 5,861,919 A | 1/1999 | Perkins et al. | |
| 5,864,823 A | 1/1999 | Levitan | |
| 5,886,731 A | 3/1999 | Ebisawa | |
| 5,917,830 A | 6/1999 | Chen et al. | |
| 5,918,014 A | 6/1999 | Robinson | |
| 5,926,205 A | 7/1999 | Krause et al. | |
| 5,931,901 A | 8/1999 | Wolfe et al. | 709/206 |
| 5,948,061 A | 9/1999 | Merriman et al. | |
| 5,966,120 A | 10/1999 | Arazi | |
| 5,969,715 A | 10/1999 | Dougherty et al. | |
| 5,978,381 A | 11/1999 | Perlman et al. | |
| 5,990,927 A | 11/1999 | Hendricks | |
| 6,002,393 A | 12/1999 | Hite et al. | |
| 6,002,394 A | 12/1999 | Schein | |
| 6,009,409 A | 12/1999 | Adler et al. | |
| 6,009,410 A | 12/1999 | LeMole | |
| 6,020,880 A | 2/2000 | Naimpally | |
| 6,020,883 A | 2/2000 | Herz | |
| 6,026,368 A | 2/2000 | Brown et al. | |
| 6,026,369 A | 2/2000 | Capek | |
| 6,029,045 A | 2/2000 | Picco | |
| 6,038,256 A | 3/2000 | Linzer et al. | |
| 6,055,510 A | 4/2000 | Henrick et al. | |
| 6,061,097 A | 5/2000 | Satterfield | |
| 6,088,722 A | 7/2000 | Herz et al. | |
| 6,119,098 A | 9/2000 | Guyot et al. | |
| 6,141,010 A | 10/2000 | Hoyle | |
| 6,144,653 A | 11/2000 | Persson et al. | |
| 6,160,570 A | 12/2000 | Sitnik | |
| 6,177,931 B1 | 1/2001 | Alexander et al. | |
| 6,253,238 B1 | 6/2001 | Lauder | |
| 6,263,501 B1 | 7/2001 | Schein | |
| 6,359,902 B1 | 3/2002 | Putzolu | |
| 6,378,130 B1 | 4/2002 | Adams | |
| 6,418,122 B1 | 7/2002 | Schoenblum | |
| 6,425,131 B2 | 7/2002 | Crandall | |
| 6,434,747 B1 | 8/2002 | Khoo | |
| 6,446,082 B1 | 9/2002 | Arita | |
| 6,446,261 B1 | 9/2002 | Rosser | |
| 6,459,427 B1 | 10/2002 | Mao | |
| 6,463,585 B1 | 10/2002 | Hendricks | |
| 6,484,317 B1 * | 11/2002 | Wright | 725/32 |
| 6,487,721 B1 | 11/2002 | Safadi | |
| 6,493,875 B1 | 12/2002 | Eames et al. | |
| 6,505,169 B1 | 1/2003 | Bhagavath et al. | |
| 6,516,002 B1 | 2/2003 | Huang | |
| 6,583,825 B1 | 6/2003 | Yuen | |
| 6,615,039 B1 | 9/2003 | Eldering | |
| 6,631,523 B1 | 10/2003 | Matthews | |
| 6,675,385 B1 | 1/2004 | Wang | |
| 6,684,194 B1 | 1/2004 | Eldering et al. | |
| 6,698,020 B1 * | 2/2004 | Zigmond et al. | 725/34 |
| 6,704,930 B1 | 3/2004 | Eldering et al. | |
| 6,718,551 B1 | 4/2004 | Swix | |
| 6,724,974 B2 | 4/2004 | Naruto et al. | |
| 6,738,978 B1 | 5/2004 | Hendricks | |
| 6,796,555 B1 | 9/2004 | Blahut | |
| 6,820,277 B1 | 11/2004 | Eldering | |
| 2001/0013124 A1 | 8/2001 | Klosterman et al. | |
| 2001/0025377 A1 * | 9/2001 | Hinderks | 725/109 |
| 2002/0026645 A1 | 2/2002 | Son | |
| 2002/0038455 A1 * | 3/2002 | Srinivasan et al. | 725/35 |
| 2002/0083439 A1 | 6/2002 | Eldering | |
| 2002/0083442 A1 | 6/2002 | Eldering | |
| 2002/0083443 A1 | 6/2002 | Eldering | |
| 2002/0087976 A1 | 7/2002 | Kaplan | |
| 2002/0104083 A1 | 8/2002 | Hendricks | |
| 2002/0129374 A1 | 9/2002 | Freeman | |
| 2002/0152471 A1 | 10/2002 | De Haas | |
| 2003/0200128 A1 | 10/2003 | Doherty | |

FOREIGN PATENT DOCUMENTS

| | | |
|---|---|---|
| WO | 9712486 | 4/1997 |
| WO | WO9827723 | 6/1998 |
| WO | 9952285 | 10/1999 |
| WO | 9965237 | 12/1999 |
| WO | WO 9965237 | 12/1999 |
| WO | WO9966719 | 12/1999 |
| WO | WO 0054504 | 9/2000 |
| WO | WO 0069163 | 11/2000 |
| WO | WO 0147279 | 6/2001 |
| WO | WO 0049801 | 10/2001 |
| WO | WO 9717774 | 10/2001 |
| WO | WO 0233973 | 4/2002 |
| WO | WO 0233975 | 4/2002 |

OTHER PUBLICATIONS

NCTA Technical Papers "Compressed Digital Commercial Insertion: New Technology Architectures for the Cable Advertising Business" 1992 8 pages.

AdLink Engineering, Ad insertion wiring diagrams, 1999, 17 pages.

U.S. Appl. No. 09/204,888, Eldering.

U.S. Appl. No. 09/635,539, Eldering.

U.S. Appl. No. 09/635,542, Eldering.

U.S. Appl. No. 09/712,790, Eldering.

* cited by examiner

FIG. 5

| | Network | UPCI | Avail Time Range | Ad | Segment | BpID |
|---|---|---|---|---|---|---|
| E1 | MTV | 05 | 20:01:00-20:18:00 | Joe's Bar and Grill 1 | College or Wealthy | 178 |
| E2 | MTV | 05 | 20:01:00-20:18:00 | Kim's Cosmetics 1 | Women | 185 |
| E3 | MTV | 05 | 20:01:00-20:18:00 | Joe's Bar and Grill 3 | Elderly | 100 |
| | MTV | 05 | 20:18:00-20:44:00 | Joe's Bar and Grill 2 | Blue Collar | 145 |
| | MTV | 05 | 20:18:00-20:44:00 | Moe's Tavern 2 | Young People | 122 |
| | MTV | 05 | 20:18:00-20:44:00 | Bill's Autos 1 | Wealthy + Elderly | 197 |

SYSTEM AND METHOD FOR DELIVERING TARGETED ADVERTISEMENTS USING MULTIPLE PRESENTATION STREAMS

This patent application claims the benefit of priority based on U.S. Provisional Patent Application No. 60/229,156 filed on Aug. 31, 2000, owned by the same assignee of the present invention and entitled "Method and System for Addressable and Program Independent Advertising," which is incorporated herein by reference.

BACKGROUND OF THE INVENTION

The invention pertains to advertising. More particularly, the invention pertains to targeted advertising using multiple presentation streams, such as in television programming delivery systems.

Traditionally, whether the television programming service is being provided by antenna broadcast, analog cable, digital cable, Direct Broadcast Satellite (DBS), Switched Digital Video (SDV) or any other means, generally all viewers of a particular program see the same ads in the same order at the same times. In essence, each advertisement is "linked" to a particular point within a particular program. If the particular viewer is not viewing the particular program at the particular time, he or she will not see the linked advertisement. In such linked advertising, the advertisements are simply part of the data stream from the head end, i.e., from the central office of the television service provider, to all subscribers of that service.

However, with modern digital television service systems, such as digital cable systems, DBS systems, and SDV systems (in which television service is received over the telephone lines, e.g., via Very high speed Digital Subscriber Line, VDSL), more personalized television service is possible. For instance, in DBS and SDV systems, individual subscriber households can be selectively addressed though STBs. In digital cable systems, a group of subscriber households can be selectively addressed through a cable node serving that group. For this reason, STBs and cable nodes may be referred to herein as addressable units.

In other words, through addressable units, the service provider can send different data to different subscribers or groups of subscribers. For instance, in telephone based systems such as SDV, the service provider can send different information to any individual subscriber through the subscriber's STB. In digital cable systems, different data can be sent to different groups of subscribers through cable nodes wherein each cable node may serve several hundred subscriber households. In addition, two-way communication between the subscriber's set top box and the service provider via the network is possible, e.g., using a Data Over Cable System Interface Spec (DOCSIS) compliant modem to provide return path communications.

The selective addressability of these modern digital television service systems renders more targeted TV advertising possible. In accordance with one targeted TV advertising method, ads that have been prepared to interest a particular subscriber of the television service network may be inserted into ad insertion spots or "avails" of the television programming stream at the particular subscriber's device (e.g., a set top box or STB). As a result, different subscribers of the same television program may view different advertisements that are particularly directed to them. PCT Patent Publication No. WO 99/66719 entitled "Techniques for Intelligent Video Ad Insertion," which is herein incorporated by reference, discloses at least one such scheme. Other such schemes are discussed in aforementioned Provisional Patent Application No. 60/229,156, owned by the same assignee of the present invention.

Although these systems provide effective means to deliver targeted ads to the subscribers, in some applications, it may be desirable to have targeted ads deliver to the subscribers without the ad insertion occurring at the subscriber's STB.

Accordingly, it is an object of the present invention to provide a system and method for delivering targeted advertising via a network, such as a television service network, using selective multiple presentation streams.

It is another object of the present invention to provide a system and method for delivering targeted TV advertising without ad insertion occurring at the subscriber's device.

It is still a further object of the present invention to provide a system and method for addressing targeted advertisements at a cable node level.

SUMMARY OF THE INVENTION

The present invention is directed to a system and method for delivering targeted TV advertisements to subscribers or groups of subscribers in a television service network system, such as a digital cable system, a Switched Digital Video (SDV) system, or a Digital Broadcast Satellite (DBS) system.

The system includes a multiple presentation stream (MPS) generator for providing multiple presentation streams in each programming channel that carry same programming (appropriate for that channel) but different ads directed to different market segments defined by different advertisers. That is, in each programming channel, a plurality of presentation streams exist wherein these presentation streams have the same programming data and same avail size and location. Each presentation stream in the programming channel carries advertisements directed to advertiser-specified market segments defined by different advertisers (e.g., the same presentation steam carries an ad directed to a market segment defined by Advertiser #1, an ad directed to a market segment defined by Advertiser #2, and so on).

Since the same presentation stream can carry ads directed to different market segments of different advertisers, the system may force switching between the presentation streams for each programming channel to select an appropriate presentation stream, so that the viewer can receive always the most appropriate ads. In one embodiment, the forced switching between the presentation streams may occur at the cable node level for each programming channel. In this embodiment, the system may force switching from one presentation stream to another presentation stream in each programming channel in response to cue tone detections. In another embodiment, the forced switching may occur at the cable node/set top box (STB) based on estimated avail times, for example, in systems where the cue tones are not available. In such systems, the system can use the scheduled time of avails as a mechanism for determining when to switch to a different presentation stream. There is a window of time around each estimated avail time during which the actual avail will occur. This might be 5 or 10 minutes in most cases. Just prior to the avail window start time, the cable node or STB could force a switching between the presentation streams if the current presentation stream does not carry the ad most appropriate for the cable node/household in the upcoming avail.

The forced presentation stream switching may be implemented using a plurality of routing stations. These stations may receive the presentation streams from the MPS generator through a delivery network, perform forced presentation stream switching and deliver all or selected presentation streams to subscribers. Depending on the type of system, the routing station may reside in a cable node/STB (for digital/analog cable system), a set top box (for DBS) or a Universal Service Access Multiplexer (USAM) device or STB (for SDV).

If the system is a digital/analog cable system wherein groups of subscribers can be selectively addressed through cable nodes, the routing station in each cable node receives the multiple programming streams for every programming channel. The routing station is configured to detect an upcoming avail and select one of the presentation streams in each channel that is carrying an upcoming ad that best matches the market segment characteristics of the cable node. As a result, one presentation stream carrying the most suitable upcoming ad is output from each programming channel at any given time. If the next ad in the currently output presentation stream does not best match the market segment characteristics of the cable node, the cable node switches to another presentation stream in that programming channel that best matches the segment characteristics of the cable node. This forced switching process is continuously and repeatedly performed for each upcoming avail in every programming channel. For digital cable (e.g., MPEG-2), the system may start looking for an "I" frame about 1 minute prior to the avail window start time. When it is found, the cable node/STB may switch presentation streams at the time that the "I" frame is received. Since an "I" frame may be transmitted every 12 to 15 frames (with 30 frames per second), the system may switch to another presentation stream prior to the avail window start time. For analog cable, the system may wait for the vertical blanking interval (in which the cue tone may be present) to switch to another presentation stream.

All the selected presentation streams from every programming channel are then continuously output from the cable node to set top boxes (STBs) of subscribers served by that cable node. Each STB continuously receives all the programming channels, each programming channel carrying only one presentation stream with an upcoming ad that best targets the subscriber served by that STB. Any switching between the presentation streams in each programming channel will not be noticed by viewers of the presentation streams. Then, according to a viewer's channel request (e.g., using a remote control), the STB tunes to the selected programming channel and displays the presentation stream of the selected programming channel on the viewer's monitor such as TV.

In accordance with another embodiment, forced switching between the presentation streams for all or selected programming channels may occur at the head end of the system such that the selected presentation streams may be output directly to subscribers' TVs (and not to STBs), e.g., in analog or digital cable systems.

On the other hand, if the system is an SDV system wherein individual subscribers can be selectively addressed and the cue tones may not be available, the routing station may reside in a USAM device or the like and the forced presentation stream switching may occur based on scheduled avail times. The routing station in each USAM device receives the presentation streams (i.e., each presentation stream carrying ads directed to different advertiser-specific market segments defined by different advertisers) for every programming channel. Each USAM device services a group of subscriber households and is capable of delivering different presentation streams to different subscriber households in that group. In accordance with a viewer's channel request, the STB located in the viewer's household generates a programming channel request to the USAM device serving that STB. The routing station in the USAM device then selects, according to scheduled avail times, one of the presentation streams in the selected programming channel, which is carrying an upcoming ad that best matches the market segment characteristics of that particular subscriber household. Here, the selection of the most appropriate presentation stream by the routing station occurs only for the requested programming channel, rather than to all programming channels in the digital/analog cable systems.

The selected presentation stream of the requested programming channel is then delivered from the USAM device to the requesting STB, e.g., via a telephone line, and is displayed on the requester's TV. If, however, a subsequent ad in the selected presentation stream does not best match the market segment characteristics of the requesting subscriber household, the USAM device, without the viewer realizing the change, switches (at a proper switching point) to another presentation stream in the same programming channel that best matches the market segment characteristics of the requesting household and delivers it to the STB. This process is continuously performed, resulting in a display of only the most targeted ad at any given time.

If the system is a DBS system, the routing station may reside in each STB and operates in the same manner as the routing station residing in the USAM device of the SDV system.

Accordingly, the present invention displays only the most appropriately targeted ads to the subscribers at any given time by continuously switching between presentation streams for all or selected programming channels.

BRIEF DESCRIPTION OF THE DRAWINGS

These and other features and objects of the invention will be more fully understood from the following detailed description of the preferred embodiments which should be read in light of the accompanying drawings.

In the drawings:

FIG. 5 is an example of a table of scheduled/inserted ads for use in SDV systems, which may be used in the present invention.

DETAILED DESCRIPTION OF THE PREFERRED EMBODIMENTS

In the present specification, a "programming stream" is a data stream carrying programming data and interspersed ad spots or "avails" for inserting ads therein. A "presentation stream" is a programming stream with the ads inserted into the avails, and thus, carries both the programming data and the ads.

Figure 1:
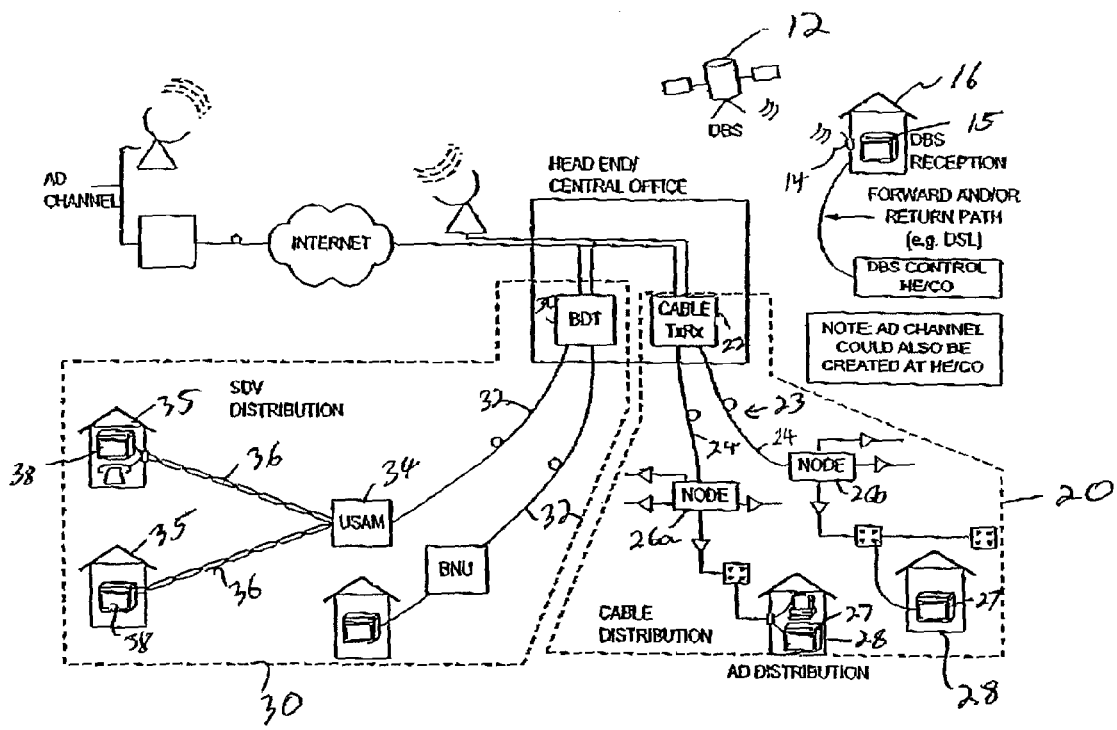
FIG. 1 is a block diagram of exemplary television service communication network environments in which the present invention may be practiced.

FIG. 1 is a block diagram of various television service delivery network environments in which the present invention may be practiced. Three of the most common types of television service delivery networks are illustrated in FIG. 1, namely, (1) a Digital Broadcast Satellite (DBS) network system, (2) a digital/analog cable network system, and (3) a Switched Digital Video (SDV) network system.

In a DBS system, a programming stream comprising upwards of a hundred channels of television programming is delivered directly from a geo-stationary satellite transmitter 12 orbiting the earth to a receiving antenna 14 mounted on or near each subscriber's house and from the antenna via a cable to a satellite receiving station 15 in the subscriber's house 16. The satellite receiving station 15 (which is a form of STB) receives the channels of programming, selects a requested channel and demodulates the signal for delivery to a monitor (e.g., a television, not shown). The DBS network can direct different programming data to different set top boxes 15 or groups of set top boxes 15 such that the set top boxes 15 are selectively addressable by the DBS network. Most DBS systems are arranged such that data can also be sent in the upstream direction, that is, from the set top box 15 to the DBS provider.

In most DBS systems, the set top box 15 also is coupled to the telephone line and is designed and programmed to place telephone calls to the DBS service provider to periodically send information in the upstream direction. Such information, for example, may comprise requests for Pay-Per-View programs or requests for changes in the subscription (a request that one or more of premium channels be added to the service, etc.).

In a typical digital/analog cable network 20, multiple channels of television information are transmitted from a head end or central office 22 via a cable network 23. Particularly, the channels are transmitted via cables 24 to nodes 26. The nodes 26 are essentially switching/routing stations which service multiple homes (usually a few hundred). The nodes 26 route the signals to individual subscribers 28. The individual subscriber will have set top boxes 27 that select a particular channel from the transmit stream, demodulate it and forward it for display on one or more monitors or televisions (not shown).

Different data streams or signals can be sent to the different nodes 26 of the network such that households coupled to the node 26a can receive different programming than households coupled to the node 26b. Thus, such systems are addressable by node, but not by individual subscriber. Upstream information may be sent from the set top box to the central office via a dedicated upstream channel over the cable. In cable systems that do not support two-way communication, the upstream "channel" can be through the telephone as described above in connection with DBS systems.

In accordance with a third type of system, namely, SDV system 30, television programming is transmitted over the regular telephone network. In this system, each individual subscriber household may be addressable. For instance, television signals are transmitted from a central office 30 via wire, typically fiber optic cable 32, to a Universal Service Access Multiplexer (USAM) device 34, which then delivers the data to multiple individual subscriber households 35 via regular telephone twisted wire pair 36 using modems (e.g., VDSL modems). The USAM device 34 receives a wide bandwidth signal comprising some or all of the television channels. However, because of the bandwidth limitations of twisted pair wire, typically only about one channel of television programming at a time can be delivered from the USAM to the household.

Accordingly, the subscriber has a set top box 38 that is similar in functionality to the set top box of a digital/analog cable system or DBS system, except that when the user changes channels, the STB transmits a request to the USAM device 34, which switches the channel for the user and begins sending the newly selected channel to the household. Typically, the channel selection signal from the viewer is known as a UPCI (User Perceived Channel Indicator) which the USAM device 34 converts into an appropriate BpID (Broadcast Program ID) and uses to send data corresponding to the BpID to the viewer's STB. SDV systems are essentially fully modern asynchronous two-way communication networks. Accordingly, the set top box can transmit information upstream via the same VDSL modem that receives the downstream signals. SDV systems typically operate using asynchronous transfer mode (ATM) protocol.

Figure 2:
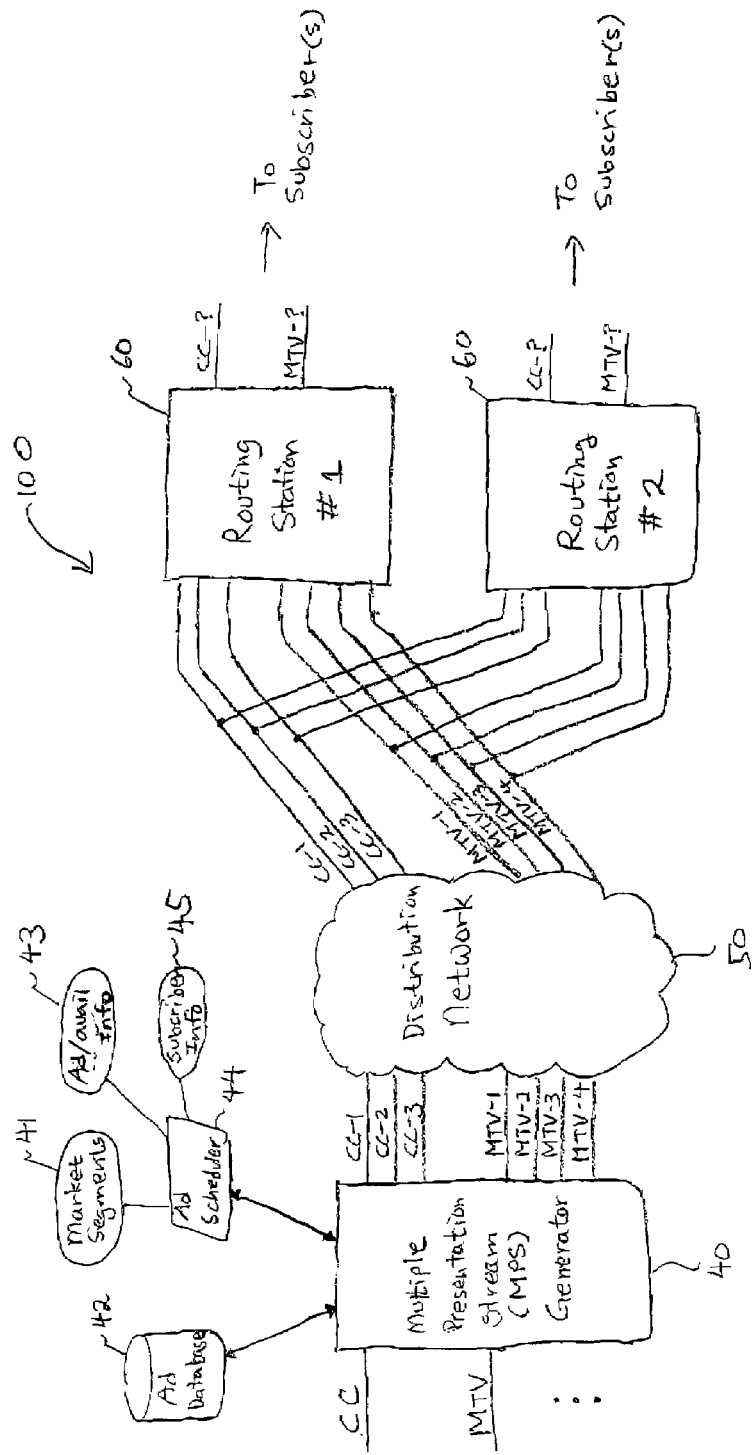
FIG. 2 is a block diagram of an advertisement delivery system in accordance with a preferred embodiment of the present invention.

A preferred embodiment of the present invention will now be described in connection with FIG. 2. FIG. 2 shows a block diagram of an advertisement delivery system 100 according to the preferred embodiment of the present invention. The advertisement delivery system 100 may be implemented in any of the television service delivery networks (e.g., SDV, cable TV, DBS, etc.) shown in FIG. 1. Although only two programming channels (i.e., Comedy Central or CC, and MTV) are specifically illustrated for the sake of clarity, it is understood that other or additional programming channels are present and that the present invention is equally applicable to all available programming channels.

As illustrated in FIG. 2, the advertisement delivery system 100 includes a multiple presentation stream (MPS) generator 40 for generating a plurality of presentation streams per programming channel, a distribution network 50 for distributing the presentation streams of all programming channels, and a plurality of routing stations 60, 60 for selectively routing the presentation streams to subscribers or groups of subscribers on the network, wherein these components are all operatively coupled. The system 100 further includes an ad database 42 for storing a library of advertisements to be inserted into programming streams to produce the presentation streams, and an ad scheduler 44 for scheduling insertion of ads.

In some embodiments, the MPS generator 40 may be located at the head end of the system, and the routing stations 60, 60 may be located at the local distribution points, e.g., at the cable nodes for cable TV systems, USAM devices for SDV systems, or STBs for satellite systems such as DBS.

In other embodiments, it may be possible to have both the MPS generator 40 and the routing stations 60 at the head end of the system.

The ad scheduler 44 schedules the order and manner in which the ads are inserted into the programming streams, and generates an ad schedule to be followed by the MPS generator 40. Information such as market segment information 41, ad/avail information 43, and subscriber information 45 may be used by the scheduler 44 to prepare the ad schedule.

The market segment information 41 may identify a list of available market segments (which can be advertiser-specific market segments or fixed market segments), and individual subscribers (e.g., by STB's MAC Id) or groups of subscribers (e.g., by cable node number) on the network that belong to each market segment. The ad/avail information 43 may identify a list of ads and the market segment(s) associated with each ad, and other ad insertion requirements set by advertisers, e.g., the advertiser's preferred channel on which the ad should be displayed. The subscriber information 45 may identify all or groups of subscribers on the network and personal information pertaining thereto. The scheduler 44 may correlate the information 41, 43 and 45 to determine which ads should be inserted into which programming stream and channel at which avail location. Unless the advertiser specifically requests insertion of his or her ad in a particular avail and programming channel, the scheduler 44 evaluates all these factors and prepares an ad insertion schedule which would generally satisfy the needs of the advertisers and the system.

In the present invention, a plurality of presentation steams exists in each programming channel wherein the presentation streams for a particular channel carry the same programming for that channel, same avail size and duration, but different ads directed to different market segments. In one embodiment, each presentation stream carries ads directed to advertiser-specific market segments defined by different advertisers (e.g., the same presentation stream may carry AD1 directed to market segment A of Advertiser #1, AD2 directed to market segment B of Advertiser #2, and so on). In another embodiment, each presentation stream carries ads directed to different fixed market segments. The system 100 determines how many of these presentation streams may exist in each programming channel. In one embodiment, the television service provider may decide this based on the total number of market segments that have been created, or are anticipated in the future based on estimated future advertisers. Generally, because of the bandwidth limitation imposed on the programming channels, only a limited number of presentation streams (e.g., 3-7) may be permitted per programming channel.

In producing the multiple presentation streams, the MPS generator 40 receives one programming stream for every programming channel from a programming generator or other source. For instance, the MPS generator 40 receives a programming stream "CC" for "Comedy Central" channel, and a programming stream "MTV" for "MTV" channel. Then, the MPS generator 40 produces multiple copies of the programming streams according to the number of presentation streams allotted for each programming channel. As a result, each programming channel will have multiple copies of the same programming stream having the same programming data, and same avail size and location. It should be noted that all programming channels do not need to have the same number of programming streams. For instance, if MTV channel is extremely popular, the TV service provider or the system operator may decide to allot 5 presentation streams for MTV channel whereas only 3 presentation streams may be allotted to the less popular CC channel.

Then, the MPS generator 40 inserts appropriate ads into the avails of the programming streams according to the ad schedule provided by the ad scheduler 44. The ads that are inserted into the avails can be provided by the ad database 42 or other storage units such as ROM, RAM, optical disks, magnetic disks, etc. Since the total number of different market segments that are created will typically exceed the limited number of programming streams allotted per programming channel, ads directed to different market segments will need to be inserted into the same programming stream. In the same presentation stream, ads directed to different advertiser-specific market segment (e.g., AD1 directed to market segment A of Advertiser #1, AD2 directed to market segment B of Advertiser #2, etc.) will be present. In the present example, this process produces a plurality of presentation streams CC-1, CC-2 and CC-3 for CC channel, and a plurality of presentation streams MTV-1, MTV-2, MTV-3 and MTV-4 for MTV channel. The presentation streams CC-1 to CC-3 carry the same CC programs, but different ads directed to different market segments. Similarly, the presentation streams MTV-1 to MTV-4 carry the same MTV programs, but different ads directed to different market segments.

The multiple presentation streams for all programming channels are then distributed to each of the routing stations 60, 60 through the distribution network 50, e.g., SDV, DBS, Internet, cable TV, HFC, or wireless TV network such as LMDS (Local Multipoint Distribution System) or MMDS (Multichannel Multipoint Distribution System). The routing station 60 represents a local router for delivering programming channels to the subscribers, and can reside in a cable node, a USAM device, or a STB depending on the type of television network system as discussed above. Each routing station 60 may force switching between the presentation streams for each or selected programming channel.

The operation of the routing station 60 may also vary slightly depending on the type of system. For instance, if the system 100 is a digital/analog cable system, the routing station 60 may reside at each cable node and receives the programming streams from all programming channels. For each programming channel, the routing station 60 in the cable node is configured to detect an upcoming avail and select one of the presentation streams in that channel, carrying an upcoming ad that best matches the market segment characteristics of the cable node. This process of forced presentation stream switching is continuously and repeatedly performed for each upcoming avail in every programming channel. Since different programming channels have different avail times and durations and different programming, switching amongst presentation streams for different programming channels will generally occur at different times. For digital cable (e.g., MPEG-2), the system may start looking for an I-frame about 1 minute prior to the avail window start time. When it is found, the routing station 60 may switch presentation streams at the time that the I-frame is received. Since an I-frame may be transmitted every 12 to 15 frames (with 30 frames per second), the system may switch to a different presentation stream prior to the avail window start time. For analog cable, the system may look for the vertical blanking intervals (in which the cue tones may be present) to switch presentation streams.

All the selected presentation streams from every programming channel are then output from the routing station 60 in the cable node and delivered to set top boxes (STBs) of subscribers served by that cable node. That is, each STB receives all the programming channels, each programming channel carrying only one presentation stream with an upcoming ad that best targets the subscriber served by that STB. When the subscriber or viewer in the subscriber household selects a particular programming channel (e.g., using a remote control), the STB tunes to the requested programming channel and displays on the viewer's monitor the presentation stream of the requested programming channel.

In accordance with another embodiment, the routing station 60 may reside in a STB of a cable system so that forced presentation stream switch may occur at the STB.

In accordance with another embodiment, the routing station 60 may reside in a node of a digital/analog cable system and each presentation stream may carry ads directed to different fixed market segments (and not advertiser-specific market segments). In this embodiment, the routing station 60 at the node may select the most appropriate presentation stream (i.e., a presentation stream carrying an upcoming ad that is most appropriate for the subscriber(s)

served by this routing station 60) and delivers it to a STB/TV of the subscriber for viewing by the subscriber.

If the system is an SDV system, each routing station 60 may reside in a Universal Service Access Multiplexer (USAM) device. Similar to the routing station in each cable node, the routing station 60 in the USAM device receives the presentation streams (having same programming but different ads) for every programming channel. However, instead of continuously delivering all programming channels to the STBs of the subscribers as in the cable system, the USAM device delivers only the presentation stream of a programming channel that is requested by the viewer.

For instance, when a viewer in a particular subscriber household selects a programming channel, the STB located in that household generates a programming channel request to the USAM device serving that STB. The routing station 60 in that USAM device then selects one of the presentation streams in the requested programming channel, which is carrying an upcoming ad that best matches the market segment characteristics of that particular subscriber household, and delivers the selected presentation stream corresponding to the requested channel to the STB for display on the viewer's monitor. If subsequent ads in the currently displaying presentation stream are not appropriate for that particular subscriber household (e.g., because the subsequent ads belong to different market segments), the routing station 60 forces switching at a proper splicing point from one presentation stream to another presentation stream (or default presentation stream) in the same programming channel that best matches the market segment characteristics of the household, and delivers it to the STB. This forced switching process is continuously performed without the viewer noticing the switching, so that at any given time, the most targeted ad is displayed to the viewer.

If the system is a DBS system, the routing station 60 may reside in each STB in the system, and operates in the same manner as the routing station in each USAM device, except that the selected presentation stream of the requested programming channel is immediately displayed on the monitor because the selection of the presentation stream occurs in the STB.

In accordance with one embodiment of the present invention, the market segments identified in the information 41 and used to insert the ads into the streams may be defined by a television service provider (e.g., Comcast Cable TV provider) based on marketing research and advertiser feedbacks. These segments would be "fixed" segments in that every advertiser will use the same segments and select one or more of these segments to direct targeted ads to the subscribers that belong to the selected segments. In another embodiment, each advertiser may define its own set of advertiser-specific market segments for addressing targeted ads. Applicant's co-pending application Ser. No. 09/731,606 filed on Dec. 7, 2000 entitled "System for Providing Targeted Advertisements using Advertiser-Specific Target Groups," which is herein fully incorporated by reference, discloses examples of systems and methods for forming advertiser-specific market segments, which may be used in the present invention.

The market segments may include a "default" segment for any subscriber or subscriber group that does not fall into any of the defined segments. Any number of market segments may be created in view of system feasibility. The market segments may not need to encompass all subscribers on the network. It is also possible that some subscribers or groups of subscribers may fall into more than one market segments of a particular advertiser. In those cases, certain priority schemes or other schemes may be used to match the subscriber or group of subscribers to one advertiser-specific market segment, if that is desired.

Figure 3:
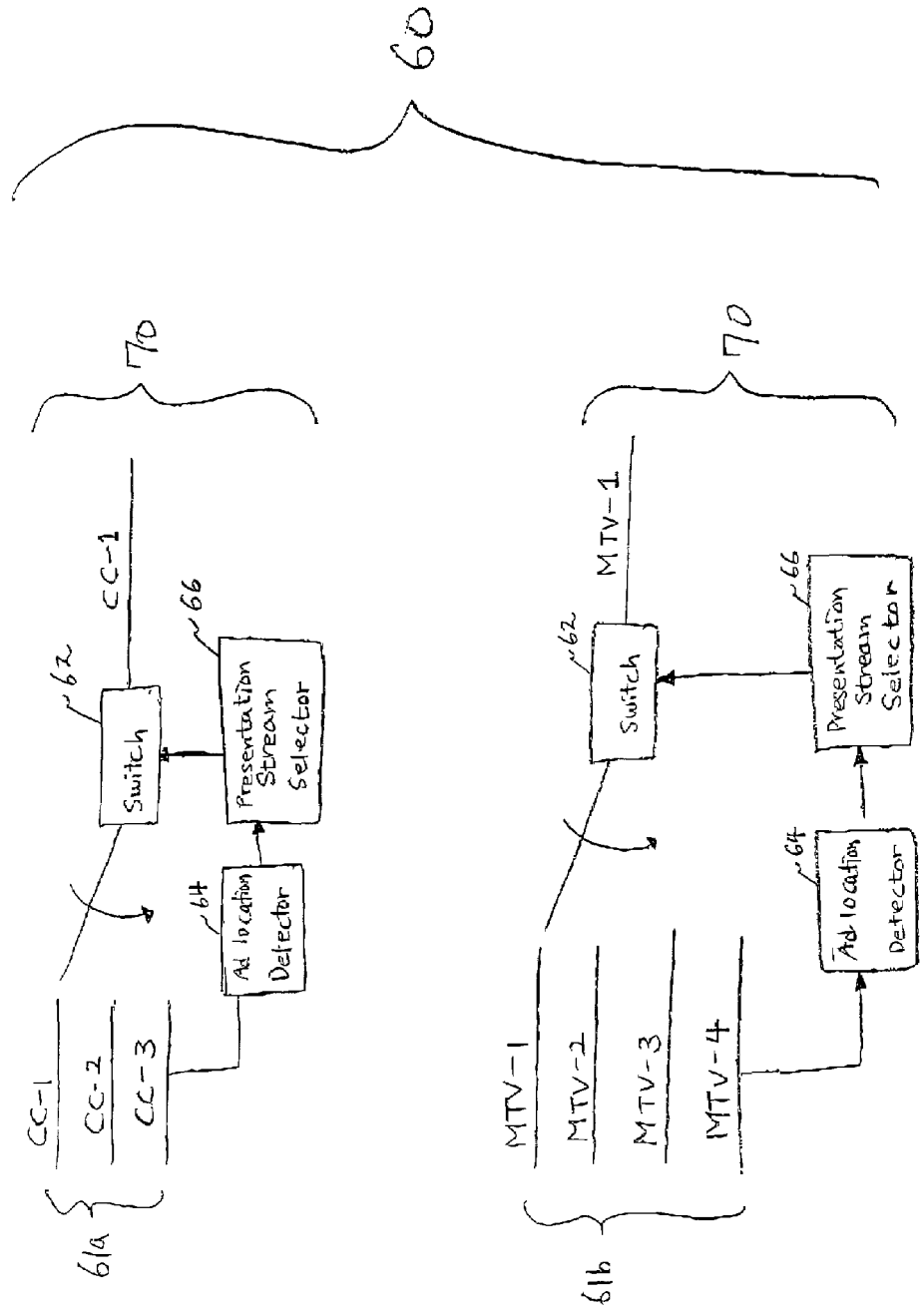
FIG. 3 is a block diagram of the routing station shown in FIG. 2 in accordance with the present invention.

FIG. 3 illustrates a block diagram of each routing station 60, which may reside at a local routing point such as a cable node, a USAM device, a STB, etc., in accordance with the present invention. Each routing station 60 is assigned with certain demographic or other characteristics based on the characteristics of the individual subscriber or group of subscribers served by the routing station 60. This characteristic information may be prestored at the routing station 60 or may be frequently transferred to the routing station 60 from the head end of the system 100.

As illustrated in FIG. 3, each routing station 60 includes a plurality of routing units 70, 70, each routing unit 70 being responsible for one programming channel. Each of the routing units 70 includes a switch 62, an ad location detector 64, and a presentation stream selector 66, all operatively coupled.

Each of the routing units 70, 70 in the routing station 60 receives the multiple presentation streams for the assigned programming channel. For instance, the first routing unit 70 receives the presentation streams (CC-1, CC-2 and CC-3) 61a for "Comedy Central" programming channel, whereas the second routing unit 70 receives the presentation streams (MTV-1 through MTV-4) 61b for "MTV" programming channel.

Each ad location detector 64 detects an ad insertion point present in one of the received presentation streams to determine where the upcoming ad may be located. This detection may occur automatically in digital/analog cable systems, whereas, in SDV or DBS systems, the detection will occur only in the ad location detector 64 responsible for the requested programming channel.

PCT Patent Publication No. WO 99/66719, the disclosure of which is incorporated hereby by reference, discloses several methods of detecting ad insertion points, such as detecting the black frames which television programmers typically provide in the video stream at the beginning of a television commercial avail. These methods may be utilized in the present invention to detect the ad location points. In another embodiment, digital cue tones set by DVS-253 digital video standards promulgated by the Society of Cable and Television Engineers (SCTE), which indicate start of avails, may be used. In still another embodiment, well-known analog cue tones embedded within the vertical blanking interval of a television signal, may be used.

The ad location detector 64 outputs its detection results to the presentation stream selector 66. When the upcoming ad location is detected, the presentation stream selector 66 determines which presentation stream should be selected and generates a switching signal to the switch 62 according to this determination. Based on the switching signal, the switch 62 selects one of the presentation streams in that programming channel. If the subsequent ad carried in the currently selected presentation stream is not the most appropriate ad because the market segment of the subsequent ad does not best match the characteristics of the subscriber household served by the present routing station 60, then the selector 66 selects another presentation stream in the same program channel, carrying the next ad that is most suitable for the current subscriber household.

As discussed hereinabove, depending on the system type, the operation of the routing station 60 may vary slightly. For instance, in the digital/analog cable system, all routing units 70, 70 are active at any given time so that each routing unit 70 continuously outputs a presentation stream and the presentation streams for all programming channels are delivered to the subscribers' STBs. In other systems such as SDV or DBS systems, only one routing unit 70 responsible for the requested programming channel would be active at a given time, and the presentation stream only for the requested programming channel will be delivered from the USAM device to the STB of the requester for display (as in the SDV system) or will be directly displayed on the monitor by the STB (as in the DBS system).

It should be further understood that the components shown in FIG. 3 represent functional aspects of the routing station 60 and that each of these components may be implemented using analog circuits and/or digital circuits, including finite state machines, digital signal processors, computers, central processing units, application specific integrated circuits (ASICs), and programmed general purpose processors.

Figure 4:
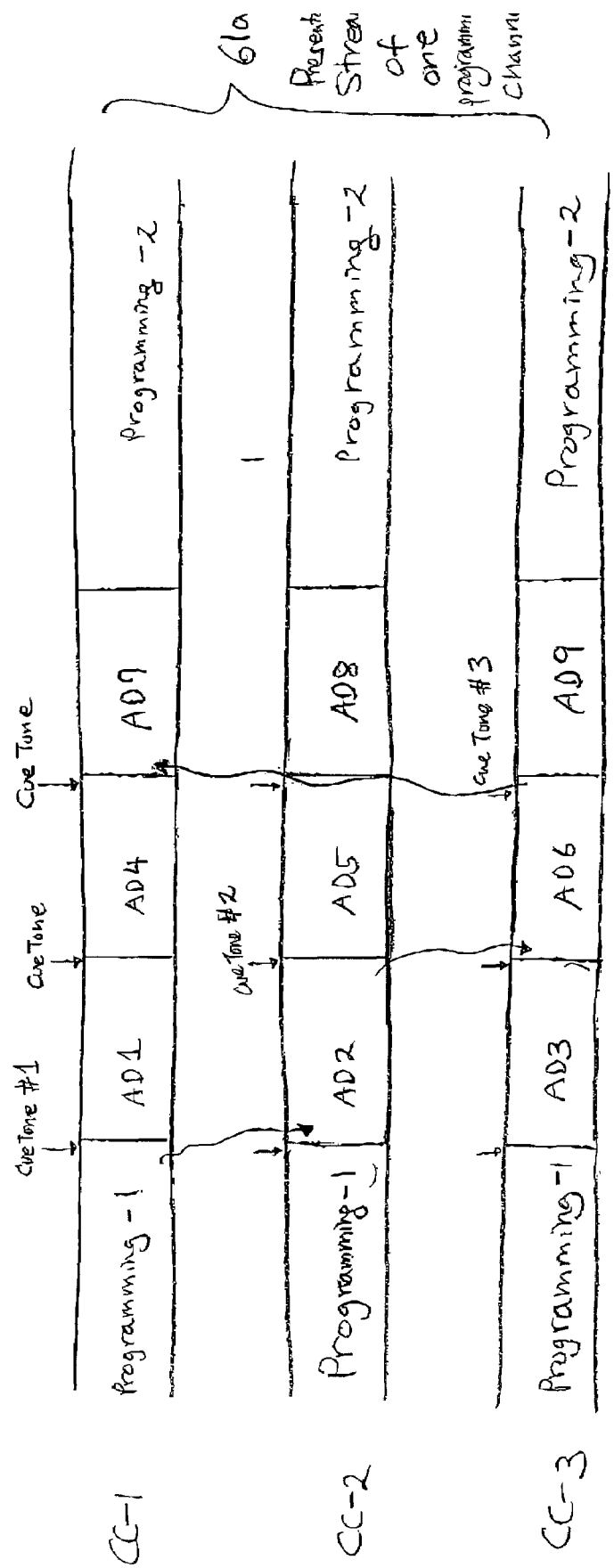
FIG. 4 is a pictorial representation of presentation streams for a programming channel in accordance with the present invention.

Referring now to FIGS. 3 and 4, one implementation of the switching process for selecting one of the multiple presentation streams of a particular programming channel ("CC" channel) will now be discussed only as an example. Other examples are possible. As shown in FIGS. 3 and 4, the first routing unit 70 is responsible for "CC" channel and receives the three presentation streams 61a (namely, CC-1, CC-2 and CC-3) for CC channel. All the presentation streams CC-1, CC-2 and CC-3 have the same programming data, Programming-1 and Programming-2, and same avail points (i.e., same avail duration and location). Different ads have been inserted into the avails by the MPS generator 40, such that the presentation streams CC-1, CC-2 and CC-3 carry different ads which may be assigned to or associated with different market segments. For instance, the presentation stream CC-1 carries ADs 1, 4 and 7, the presentation stream CC-2 carries ADs 2, 5 and 8, and the presentation stream CC-3 carries ADs 3, 6, and 9. Each of these ADs 1-9 may be assigned to one or more of the available market segments based on the appropriateness of the ad for the subscribers belonging to that market segment.

Each of the presentation streams CC-1, CC-2, CC-3 will include an indicator indicating where the beginning of each ad is located in the presentation stream. For example, analog or digital cue tones which indicate the beginning of each avail are used to insert ads into the avails. One skilled in the art would readily understand that the cue tones are typically included in the presentation streams, and if they are not, they may be introduced at the head end of the system.

Currently, assume that the first presentation stream CC-1 is selected by the switch 62. When the ad location detector 64 detects a cue tone (Cue Tone #1) in the first presentation stream, it informs the presentation stream selector 66 of this detection. Because all presentation streams 61a have the same programming data and same ad locations (but different ads), they will have the cue tones at the same locations. Therefore, it is only necessary to detect the cue tones in one presentation stream of the programming channel. The presentation stream selector 66 then examines a table or list of scheduled/inserted ads identifying which ads are inserted in which avails for each of the presentation streams 61a. This table further identifies market segment(s) associated with each scheduled ad. The table may be provided to the selector 66 by the ad scheduler 44 through the distribution network 50 or a server on the network 50.

From the table of scheduled ads, the selector 66 determines that ADs 1, 2 and 3 are scheduled to be present in the upcoming avails of the presentation streams CC-1, CC-2 and CC-3, respectively, and identifies from the table the market segment(s) assigned to each of these ads. The selector 66 then compares these market segments with the demographics or other characteristics assigned to the routing station 60. If there is only one match, then the selector 66 generates a switching signal instructing the switch 62 to switch to the presentation stream carrying the ad corresponding to the matched market segment. If there is more than one match, then the selector 66 may select the market segment that is most appropriate according to some predetermined criteria and generate a switching signal to the switch 62 to select the presentation stream carrying the ad corresponding to the selected market segment. In the alternative, other schemes (e.g., random selection) may be used to select only one of the matched market segments. If there is no match or a match with a below-threshold correlation level, the selector 62 may select a default presentation stream or other selection schemes are performed to select one of the presentation streams 61a.

In this example, the selector 66 determines that the market segment for AD 2 best matches the demographics of the subscribers that are coupled to routing station 60, and generates a switching signal to the switch 62 to select the second presentation stream CC-2 (carrying AD 2) at the proper time, e.g., at the beginning of or just before AD 2. In a similar manner, at the end of AD 2, the switch 62 may select the third presentation stream CC-3, and so on. Therefore, at any given time, each routing unit 70 may output one presentation stream having the most appropriately targeted ad for the assigned programming channel and time period.

In accordance with the present invention, if the TV delivery system is a Switched Digital Video (SDV) system or other systems wherein cue tones may not be used, the switching between multiple presentation streams can be performed for each programming channel based on the scheduled avail times. Since there is a window of ad insertion time surrounding each expected avail as discussed above, it is preferred that the selector 66 utilizes a time range encompassing the expected avail time and the ad insertion window(s) to ensure a smooth and continuous presentation. The ad insertion window may be 5 or 10 minutes in some cases. Just prior to the window start time, the STB may force a switching between the presentation streams if the current presentation stream does not carry an upcoming ad that is most appropriate for the subscriber served by the STB or the like.

In some embodiment, the ad scheduler 44 may provide to each routing station 60 (e.g., residing in the USAM device 34) a table identifying avail time range, the scheduled/inserted ads, and the market segment(s) associated with each ad. In one embodiment, the avail time range may correspond to the end of the ad insertion window of a previous ad and the end of the ad insertion window of the current ad. If the ad insertion windows overlap, the avail time range may start or end at the mid point of the overlap. Further, this table may include UPCIs (User Perceived Channel Indicators) and corresponding BpIDs (Broadcast Program IDs) typically used in SDV systems. FIG. 5 shows an example of such a table which can be used in the present invention.

Referring to FIG. 5, if a viewer changes a channel to MTV (UPCI 05) during the avail time range, e.g., from 20:01:00 to 20:18:00 during which an avail/ad is expected, the routing unit 70 responsible for the requested channel searches the table for an entry that matches the UPCI for the given time. The search will result in multiple hits, e.g., E1-E3. Then the routing unit 70 compares the market segments of the ads in these entries E1-E3 with the market segment characteristics assigned to the viewer's STB (e.g., identifiable by MAC ID). If more than one match is found, the first matching entry may be selected if the market segment characteristics assigned to the viewer's STB is arranged in the order of their importance. If no match is found, then the routing unit 70 may randomly select one of the hit entries E1-E3 or may select a default entry designated by the scheduler 44. Any other schemes may be used to narrow the multiple hit entries into one that is best suitable for the current viewer. Then the BpID of the selected entry is used by the routing unit 70 to output the presentation stream (data) corresponding to that BpID for viewing by the viewer.

In accordance with one embodiment, forced switching between the presentation streams may occur at the head end (e.g., in digital/analog cable systems) such that the selected presentation streams are directly delivered to subscribers' TVs (and not to STBs).

Thus, the present invention provides a system and method for addressing targeted advertisements to subscribers using multiple presentation streams carrying the same programming but different ads directed to different market segments. By selecting presentation streams that are carrying the most appropriate ads for all or selected programming channels at any given time, effective targeted TV advertising can be accomplished.

The invention has been thus described with respect to delivering targeted ads to the subscribers on a television programming service network. However, it should be understood by persons of skill in the art that the invention can be used to delivery other data.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed:

1. A method of delivering presentation streams carrying targeted advertisements to subscribers in a switched television service network environment, the method comprising:
   (a) defining a plurality of market segments;
   (b) generating a set of presentation streams corresponding to a programming channel having programming data, each of the presentation streams in the set corresponding to a different one of the plurality of market segments, each of the presentation streams in the set carrying the same programming data as the programming channel and at least one advertisement directed to the market segment to which the presentation stream corresponds, wherein the presentation streams are generated independent of a request for the programming channel by the subscribers;
   (c) simultaneously delivering the set of presentation streams to a switching device;
   (d) receiving at the switching device a first request for the programming channel from a first subscriber in a first market segment;
   (e) switching a first presentation stream corresponding to the first market segment from the set of presentation streams to the first subscriber;
   (f) receiving at the switching device a second request for the programming channel from a second subscriber in a second market segment; and
   (g) switching a second presentation stream corresponding to the second market segment from the set of presentation streams to the second subscriber.

2. The method of claim 1 further comprising:
   (h) simultaneously transmitting the first and second presentation streams to the first and second subscribers, respectively.

3. The method of claim 1 further comprising:
   (h) generating a schedule of advertisements to be included in the presentation streams for each market segment; and
   (i) storing a library of advertisements to be included in the presentation streams in the set.

4. The method of claim 3 wherein the schedule is generated based on market segment information, avail and ad information, and subscriber information for the corresponding market segment.

5. The method of claim 4, wherein the market segment information identifies advertiser-specific market segments for all advertisers associated with the library of advertisements.

6. The method of claim 1 wherein step (b) includes inserting the advertisements into the respective presentation streams in the set by detecting a cue tone present in the presentation streams.

7. The method of claim 1 wherein step (b) includes inserting the advertisements into the respective presentation streams in the set based on scheduled avail times in the presentation streams.

8. The method of claim 1 wherein step (b) is performed at a head end of the television service network.

9. The method of claim 1 wherein the market segments are defined by different advertisers.

10. The method of claim 1 wherein the advertisements in the presentation streams are directed to different fixed market segments.

* * * * *